United States Patent [19]
Gudausky, Jr.

[11] Patent Number: 5,121,549
[45] Date of Patent: Jun. 16, 1992

[54] APPARATUS FOR TESTING ARCHERY ARROWS AND METHOD OF MANUFACTURE

[76] Inventor: William V. Gudausky, Jr., 22253 Chestnutridge Rd., Kildeer, Ill. 60047

[21] Appl. No.: 789,256

[22] Filed: Nov. 7, 1991

[51] Int. Cl.⁵ .............................. G01B 5/25
[52] U.S. Cl. .................................... 33/533
[58] Field of Search ............ 33/533, 549, 550, 501

[56] References Cited

U.S. PATENT DOCUMENTS

| | | | |
|---|---|---|---|
| 2,470,404 | 5/1949 | Kloos | 33/533 |
| 2,876,822 | 3/1959 | Groves | 33/533 |
| 3,163,305 | 12/1964 | Stanton | 33/533 |

Primary Examiner—Harry N. Haroian
Attorney, Agent, or Firm—Charles F. Meroni

[57] ABSTRACT

An archery arrow testing apparatus. The application is comprised of a pair of upright arrow support stands. The stands are separated and held together by means of a multi-part rod structure. The multi-part rod structure is for spacing the stands with the structure having its opposite ends extended into telescoped engagement with the stands. The rod structure is adjustable in length in a longitudinal direction along its axis for varying the distance between the stands. The arrow support stands are each being comprised of a pair of stand halves which are of an identical shape and configuration to enable them to be molded in a single mold structure. Connectors and/or glue secure the mold halves of each of said stands together. Pairs of revolving thin plastic disks are provided. Each of the stands has a mold cavity defined by the halves. Baring connectors mount each of the pairs of the revolving thin synthetic plastic disks inside an associated one of the cavities in radially overlapped relation so as to define an arrow nip between the disks, with the pairs of disks on each of said stands being rotatable relative to said stands enabling an archery arrow to be spun in circumferential orbit on the pairs of the disks in said nips for human eye scrutiny to ascertain trueness of an orbiting archery arrow.

20 Claims, 2 Drawing Sheets

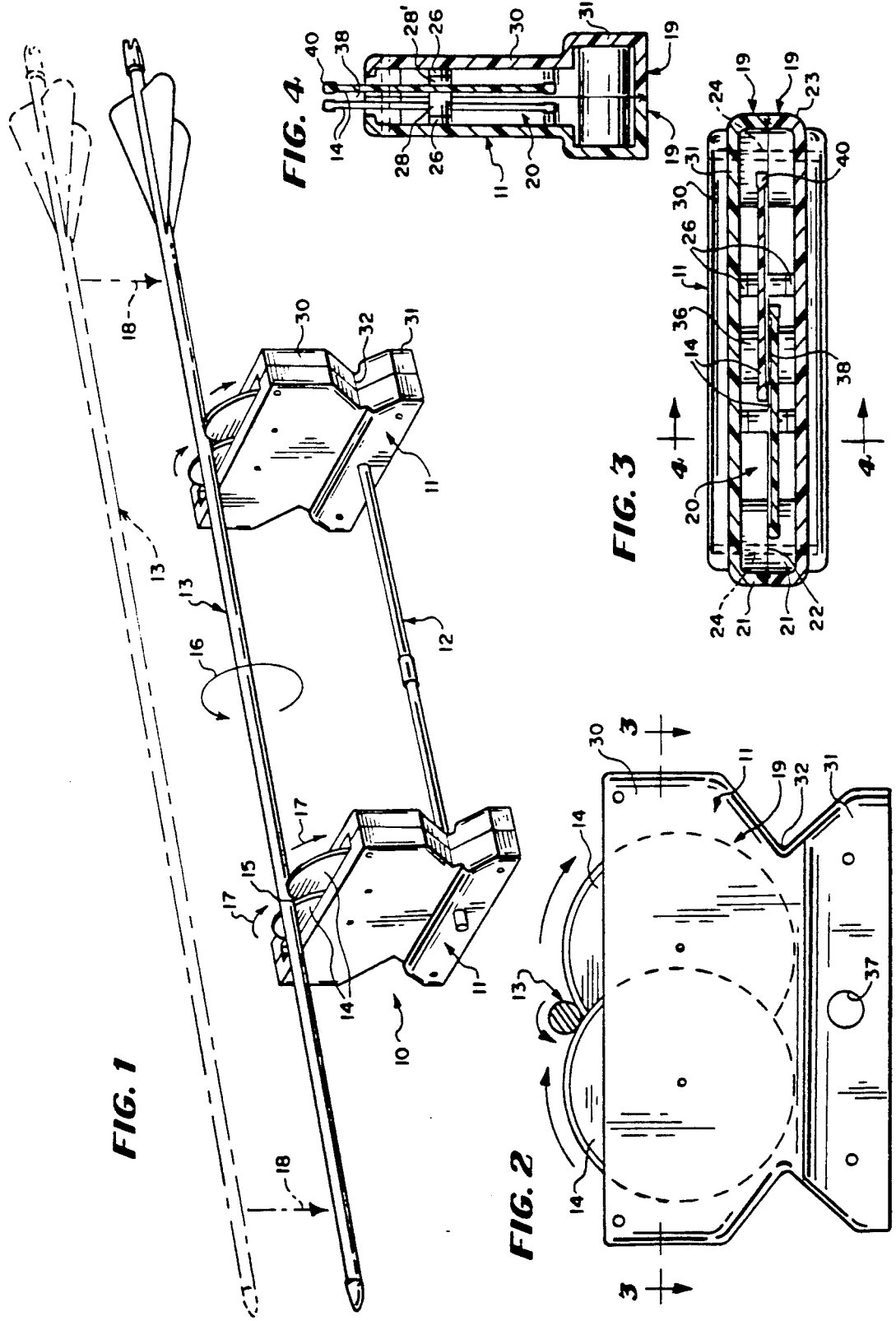

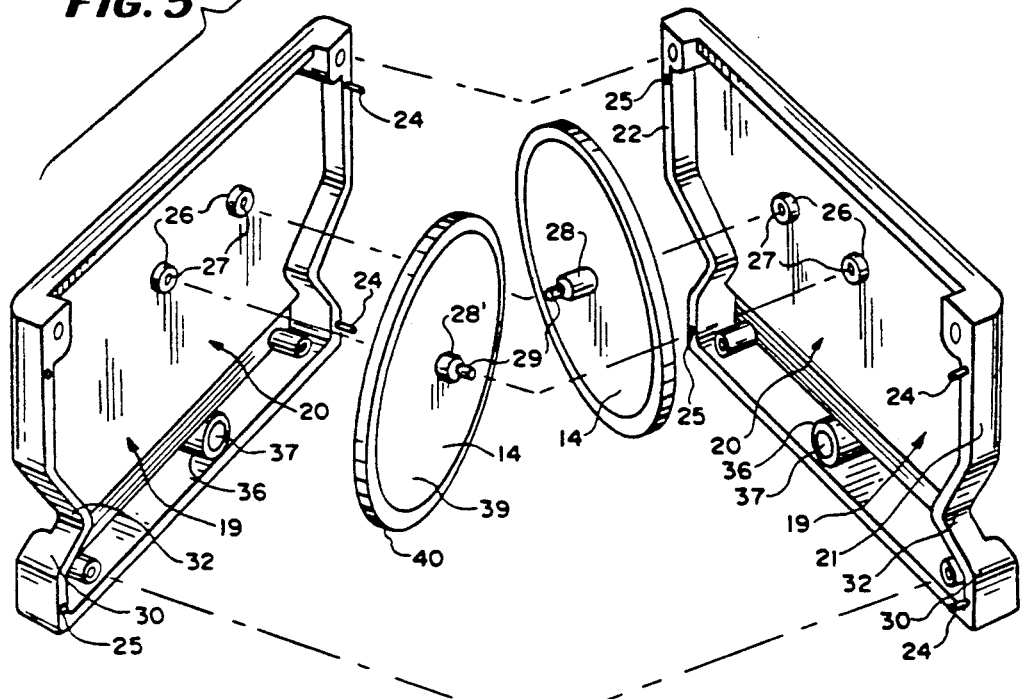
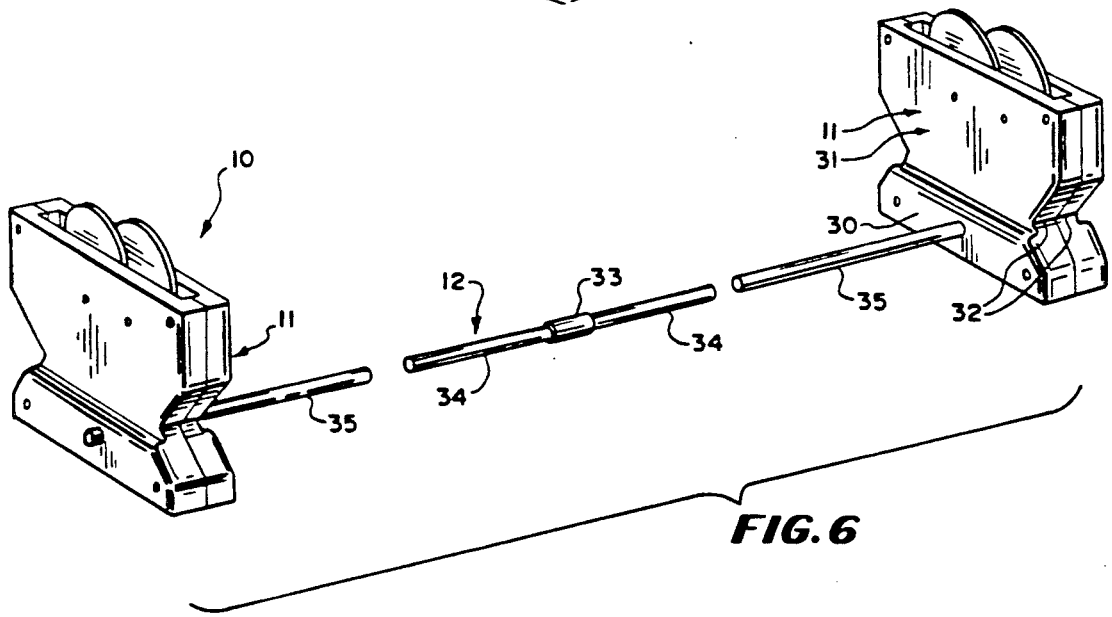

5,121,549

APPARATUS FOR TESTING ARCHERY ARROWS AND METHOD OF MANUFACTURE

FIELD OF THE INVENTION

My new and improved archery arrow testing apparatus is a precision instrument that will not tolerate abuse and must be handled with care. With proper use it will enable the user to check archery arrows for accuracy; straightness, nock, and point alignment, and also it can be used to check horizontal and vertical balance thus eliminating old techniques for arrow testing and enabling tests to be more accurately carried out.

My apparatus includes arrow supporting bases or stands which are each of an identical molded construction. One mold can be used to form all four halves of the bases including the balancing wheels or disks. The mold that is used is one that will enable each half and each wheel or disk to be cast. The wheel or disk that is molded from synthetic plastic has hub portions which are of varying lengths extending axially of the center axis of the wheel to be formed as will be seen from the sample supplied by the client. By providing wheel hubs of varying lengths, then the wheels or disks can be mounted in lapped relation on the base half so that the wheels or disks are overlapped when journaled on the base.

Now turning to the base half, it will be seen that they are all identical and that each half has two pins projecting upwardly on one side of the base half and two pin holes on an opposite side of the base half. By this construction, when the base halves are put in confronting relation with the cavity sides opposed to one another, the pins on one base half will align with the pin holes on the opposite base half at each margin of each base half so that the respective base halves can be engaged together in relation with the pins in one half in the pin holes in the other half to secure the halves together. It is contemplated that adhesive be used on the margins of the confronting base halves to glue the base halves in assembly together after the balancing wheels have been engaged properly in the pin holes that are provided on each of the base halves for enabling the wheels or disks to be journaled so as to be able to be freely rotatable when mounted on the base halves of each base.

It has been found that my new apparatus is superior from a cost advantage point to the one that is the subject of my co-pending application U.S. Ser. No. 07/667,539 filed Mar. 11, 1991 entitled Apparatus For Testing The Trueness Of Archery Arrows. More particularly, I have found that my new apparatus can be manufactured and sold with a ⅓ savings in cost as compared to the metal type of an arrow balancing apparatus shown and described in my pending U.S. patent application (supra) which has a suggested retail price that is almost double the suggested retail price of the new apparatus that is herein disclosed. By making the arrow balancing apparatus from plastic, as now contemplated, considerable savings can be effected not only in the cost of materials, but also in the cost of assembly since the earlier arrow balancing apparatus required a substantially greater amount of time to assemble than the new one notwithstanding the cost savings in the materials that is afforded by the new molded construction.

With respect to the rod structure for securing the bases together, it will be seen that the rod structure is of a segmented three piece construction with two identical end pieces and a center piece that has reduced opposite ends for telescoped engagement within opposed tubular ends of the end sections of the rod. The end sections can be moved either towards or away from one another for the purpose of reducing or expanding the distance between the bases or stands, as desired.

With respect to other cost saving features, it will be seen that each base half is indented at its margins to reduce material. Also, additional tubular bosses are provided on the inside of each base half so that screws can be inserted through the base halves to secure the base halves together should it be desired to eliminate the gluing of the base halves together.

It will thus be seen that I have provided a new and more economical archery arrow testing apparatus having a new and improved base construction that can be more economically manufactured and yet which can be easily adjusted to accommodate a variety of different sized arrows or arrows having different lengths when different sized arrows are to be tested on my arrow testing apparatus to determine imperfections in the construction of the arrows whether the tips or the feathers are incorrectly mounted or whether the arrow has been damaged or formed incorrectly along its shaft to generate a wobbling flight pattern.

SUMMARY OF THE INVENTION

According to my invention, I have provided an archery arrow testing apparatus comprising a pair of upright arrow support stands. The stands are separated and held together by means of a rod structure. Opposite ends of the rod structure are attached to the stands. The stands are each comprised of a pair of stand halves which are of an identical shape and configuration to enable them to be molded in a single mold structure. The mold halves of each stand are secured together. Pairs of revolving thin plastic disks are provided. Each mold stand has a mold cavity defined by the halves. A means is provided to mount each of the pairs of the revolving thin synthetic plastic disks inside an associated one of the cavities in radially overlapped relation so as to define an arrow nip between the disks, with the pairs of disks on each of the stands being rotatable relative to the stands enabling an archery arrow to be spun in circumferential orbit on the pairs of the disks in the nips for human eye scrutiny to ascertain trueness of an orbiting archery arrow.

According to important features of my invention, I have here provided an archery arrow testing apparatus, which further includes a multi-part rod structure. The multi-part rod structure is for spacing the stands with the structure having its opposite ends extended into telescoped engagement with the stands. The rod structure is adjustable in length in a longitudinal direction along its axis for varying the distance between the stands.

According to other features of my invention each of the disks has axially centered bosses positioned in axially centered relation on opposite sides of the disk associated therewith. The disks are molded in integral assembly with the bosses. One of the bosses is mounted on each of the disks and has a greater axial dimension than another of the bosses thus enabling the radially lapped disks to be positioned in side-by-side lapped relation in the cavity to provide the nip.

Yet other features relate to each of the bosses having a pin at an axially outer end, the halves each having a pair of apertured bosses disposed on an inner side of the half in confronting relation to the other associated half when the halves are secured together. The pins on the disks are engageable in the apertured bosses so that each disk is secured at opposite sides in a pair of the apertured bosses to provide bearing supports for the disk.

Further features of my invention relate to the multi-part rod structure being comprised of three separate parts with tubular endmost parts and a centermost part therebetween. The centermost part has opposite ends of reduced cross-sectional configuration for telescoped engagement interiorally of confronting open tubular ends of the other two endmost parts whereby the parts can be adjustably positioned relative to one another by sliding open of the endmost parts axially back and forth relative to one of the stands.

Still further features relate to the longer boss on each of the disks having an axial length exceeding the radial thickness of the disk thus enabling the disks to freely rotate relative to one another when mounted in the cavity.

Yet another feature relates to the bosses on each of the disks being mounted in one of the cavities, the bosses having an axial length sufficient to maintaining the disks in the cavity in axially spaced relation for free out-of-contact rotation relative to one another.

BRIEF DESCRIPTION OF THE DRAWINGS

Other objects and features of my invention will become more fully apparent in view of the following detailed description of the drawings illustrating the single embodiment.

FIG. 1 is a diagrammatic perspective view showing the way in which an archery arrow can be mounted on my apparatus for testing the trueness of an orbiting arrow with the arrow being shown in full and dotted lines and with the direction of rotation of the arrow being shown relative to the direction of the supporting disks;

FIG. 2 is an enlarged partially sectioned view shown on a line 2—2 looking in the direction indicated by the arrows as seen in FIG. 1;

FIG. 3 is an enlarged horizontal section taken on the line 3—3 looking in the direction indicated by the arrows as seen in FIG. 2;

FIG. 4 is an enlarged fragmentary partially sectioned view similar to FIG. 3 only viewed on the line 4—4 looking in the direction indicated by the arrows as seen in FIG. 3;

FIG. 5 is an enlarged exploded view of an arrow support stand, as used on my archery arrow testing apparatus; and FIG. 6 is an enlarged exploded view showing my archery arrow testing apparatus with a multi-part rod structure being shown in a disengaged position for illustrating the way in which the stands can be moved towards and away from one another for adjusting the length of the arrow testing apparatus to fit the arrow being tested.

DESCRIPTION OF A PREFERRED EMBODIMENT

I have indicated my archery testing apparatus with reference numeral 10 as seen in the drawings. The apparatus 10 includes a pair of upright arrow support stands 11, 11. These stands are secured together by means of a multi-part rod structure 12. The apparatus is adapted to have archery arrows indicated by the reference numeral 13 mounted thereon for the purpose of testing the trueness of the arrow. The arrow 13 is shown in full and dotted lines for illustrative purposes.

Mounted each of the stands 11 is a pair of discs 14—14. These disks co-act together since they are mounted on the stands in offset relation to one another to define an arrow receiving nip 15. The arrow when rotated on the archery arrow testing apparatus 10 can be rotated in either direction, but as illustrated, it is rotatable in the direction indicated by the arrow 16 as shown in FIG. 1. When the arrow is rotated in this manner, the disks 14, 14 are caused to rotate in the direction indicated by the arrow 17, 17.

It will be further see that the archery arrow 13 is adapted to be moved into the nips 15 on the stands 11, 11 by moving arrows 18 in the direction indicated by the lead line arrows 18, 18 also shown in FIG. 1.

The components of my archery arrow testing apparatus, with the exception of the multi-part rod structure 12 are preferably manufactured from synthetic plastic of a suitable type, and two separate molds are required to make the components. One mold is required for manufacture of the disks 14, and another mold is required to manufacture pairs of stand halves 19, 19 (FIG. 5). The stand halves 19, 19 are identical and hence one mold can make all of the stand halves that are required for my archery arrow testing apparatus.

It will further be seen that when the pairs of stand halves 19, 19 are positioned in secured assembly together to form a arrow support stand 11, that the halves serve to define a cavity 20. It is in this cavity that the disks 14, 14 are mounted.

It will further observed that from FIG. 5 that each stand half has an annular flange 21 which provides an annular edge 22. The flange 21 and the edge 22 are so oriented so that when the halves 19, 19 of each stand 11 are positioned in readiness for assembly, the edges 22, 22 on the opposing halves 19, 19 are disposed in edgewise confronting relation. An adhesive of any suitable type is then applied to the annular edges 22, 22 at X (FIG. 3) so that these edges can be glued together, if desired.

As an alternative way for securing the mold halves 19, 19 together, or as a supplemental procedure to be used with the adhesive 23, I have provided one side of each mold half 19 with a pair of pins 24, 24, which pins project outwardly from the annual edge 22 as previously described. On an opposite side of the half 19 on the same annular edge 22 are a pair of pin holes 25, 25. When a pair of stand halves 19, 19 are to be assembled together, the identical halves are so coordinated that the pins 24, 24 on one half line up with the pin holes 25, 25 on the other half so that the pins 24, 24 can be engaged in the pin holes 25, 25 on the other half.

It will further be observed from FIG. 5 that the halves 19, 19 are provided with bearing bosses 26, 26 for enabling the disks 14, 14 to be mounted in rotative assembly with the bearing bosses 26, 26 as will hereafter be described in further detail. These bosses 26, 26 are also provided with bearing holes 27, 27. Axially extending disk bosses 28, 28 of varying axial lengths are provided on each of the disks so that a longer boss 28 is positioned on one side of each disk 14 and a shorter boss 28' is provided on an opposite side of the same disk 14. These bosses 28, 28' also are provided with axially extending disk pins which are positioned on opposite of each disk 14, and it is these pins that are engageable in the holes 27, 27 on the bearing bosses 26, 26. The pins are loosely fitted inside the holes 27, 27 so that the disks can freely rotate on the pins in the holes 27, 27 in the bosses 26, 26. The provision of shorter and longer axially extending disk bosses enables the disks 14, 14 to be mounted in the cavity 20 laped spaced relation as shown in FIGS. 3 and 4 whereby the disks 14, 14 can freely rotate relative to one another, and be so positioned as to provide the arrow nip 15 for receipt of the arrow 13 as previously described.

The stands 11, 11 are uniquely shaped and configurated to reduce the amount of material required to manufacture the same and to this end, the stand includes a wider base section 30, narrower upper disk carrying portion or section 31 and opposite ends of each stand 11 is indented at 32, 32 to further reduce the amount of material required to manufacture the stand.

In the illustrated embodiment of my invention, I have provided the multi-part rod structure 12 as previously described. This rod structure 12 includes a center rod section 33 having reduced opposite ends 34, 34 which can be made preferably from a suitable molded synthetic plastic or from a suitable metal, as may be desired. Cooperable with the center rod section 33 are a pair of tubular end rod sections 35, 35 which are preferably of a metallic construction. These components are shown in FIG. 6. The end rod sections 35, 35 are adapted to be movable relative to the stands 11, 11 to vary the distance between the stands to accommodate arrows 13 having varied lengths. More particularly, the tubular end rod sections are adapted to slide within rod bosses 36, 36 to make the required adjustment to move the stands either towards one another or away from one another. In FIG. 6, it will be seen that one end of the rod section protrudes through the stand for the purpose of exemplifying one of the adjusted positions. This adjustment is also shown in FIG. 1. In FIG. 5 it will be seen that the mold halves 19, 19 are provided with rod bosses 36, 36 just inside of the annular flange 21 at the bottom portion of the wider base 30. These bosses 36, 36 have wide rod holes 37, 37 for receiving opposite ends of the tubular end rod section 35, 35 as illustrated in FIG. 6.

As previously described the disks 14, 14 are mounted in the cavity 20 and the shorter and longer disk bosses 28, 28' serve to maintain the disks 14, 14 mounted in rotatable assembly with the stand halves 19, 19. It will also be observed that there is a gap 38 (FIG. 3) between the disks 14, 14 so that the disks are maintained out of contact with one another to insure that they can freely rotate without any interference.

Also, to conserve synthetic plastic material it will further noted that the disks 14, 14 are each provided with a central disk web 39 and a wider disk rim 40. It is the rim 40 that is engaged with the arrow, and by providing a wider disk rim a greater surface area will be engaged with the arrow 13 when the arrows are being tested on the archery arrow apparatus 10.

SETTING UP

The shaft should be set with approximately ⅓ its length between uprights for ideal results. A base having a length of 12 inches is adequate to support arrows up to 36 inches in length.

HORIZONTAL BALANCE (PERCENT FRONT OF CENTER) (F.O.C.)

Measure the arrow first from its point to its nock. If it is 30 inches as an example, then divide 30 by two. Then mark the center of arrow between its opposite ends at 15 inches. Then find the arrow balance, and move the arrow to the left or to the right on one upright until balance is achieved. Mark. Measure this distance from center, and it may be 3 inches. FOC. Divided 30 into 3 = 10% FOC. (Front of center) Total length of arrow (30) inches divided into distance FOC (3) inches = (10) % FOC. Highest accuracy will be achieved with the least amount of variation between arrows, % FOC and total weight. Balance can be achieved by adding or subtracting weight to point or tail. To fly the same: arrows should weigh and balance the same.

SPIN CHECK

Place the arrow on the uprights in horizontal balance when centered on the uprights. The arrow should then be spun and the arrow can then be checked for wobble (straightness), point and nock alignment. The higher the spin rate achieved without arrow bounce the straighter the arrow. A low spin rate can best be used to check nock and point alignment.

VERTICAL BALANCE

Arrows must be straight to check for vertical balance. Vertical balance is affected by arrow straightness, vane balance, broadhead balance, and/or a heavy spot in the shaft. You can expect the same performance from an unbalanced arrow as you could from an unbalanced tire on your car.

VANE BALANCE

Normally, if care was taken to glue on vanes leaving no excess amount of glue from vane to vane, then the vanes should be in good balance. Each arrow should be spin checked a number of times. If one vane consistently drops to the bottom after being spun on the upright, that vane is heavy with the arrow being unbalanced. To balance the unbalanced arrow, the excess glue should be removed from that vane, or add a drop or two of glue to the opposite side of the arrow. A balanced arrow will come to rest in a different position after each spin on the uprights. On a hunting shaft with a broadhead, vane balance is checked before installing the broadhead.

BROADHEAD BALANCE

Broadhead balance can be checked in my apparatus. My apparatus can be used to determine the existence of arrow head imbalance where the point is not straight to shaft and also to determine the existence of unbalanced blades.

Broadhead arrows can be spun on the apparatus to determine if the arrow shaft rotates free of point wobble. Each blade must be in balance with the others. A heavy blade will fall to the bottom. To balance remove metal from heavy blade, rotate, or replace. A balanced arrow will come to rest in a different position each spin. This may take some time but testing and repairing the arrow to be sure that it rotates properly can be the difference in taking home a trophy or missing the target.

MAINTAINING ARROWS FOR ACCURACY

The arrows 29 should be spun checked before each hunt, tournament, or as often as possible. It can give the competitor a winning edge. Point, nock, shaft, etc. all must be in balance to each other and if any change is made, then the arrow must be retested to be sure a correct adjustment has been made.

As various possible embodiments may be made in the above invention for use for different purposes and as various changes might be made in the embodiments and method above set forth, it is understood that all of the above matters here set forth or shown in the accompanying drawings are to be interpreted as illustrative and not in a limiting sense.

I claim:

1. An archery arrow testing apparatus comprising a pair of upright arrow support stands, the stands being separated and held together by means of a multi-part rod structure, the multi-part rod structure for spacing the stands with said structure having its opposite ends extended into telescoped engagement with said stands, the rod structure being adjustable in length in a longitudinal direction along its axis for varying the distance between the stands, the arrow support stands each being comprised of a pair of stand halves which are of an identical shape and configuration to enable them to be molded in a single mold structure, means securing the mold halves of each of said stands together, pairs of revolving thin plastic disks, each of said stands having a mold cavity defined by said halves, means mounting each of said pairs of the revolving thin synthetic plastic disks inside an associated one of said cavities in radially overlapped relation so as to define an arrow nip between said disks, with said pairs of disks on each of said stands being rotatable relative to said stands enabling an archery arrow to be spun in circumferential orbit on said pairs of said disks in said nips for human eye scrutiny to ascertain trueness of an orbiting archery arrow.

2. The archery arrow testing apparatus of claim 1 wherein each of said disks have axially centered bosses positioned in axially centered relation on opposite sides of the disk associated therewith, the disks being molded in integral assembly with said bosses, one of said bosses mounted on each of said disks having a greater axial dimension than another of said bosses thus enabling said radially lapped disks to be positioned in side-by-side lapped relation in said cavity to provide said nip.

3. The archery arrow testing apparatus of claim 2 wherein each of said bosses has a pin at an axially outer end, said halves each having a pair of apertured bosses disposed on an inner side of the half in confronting relation to the other associated half when the halves are secured together, the pins on the disks being engageable in said apertured bosses so that each disk is secured at opposite sides in a pair of the apertured bosses to provide bearing supports for the disk.

4. The archery arrow testing apparatus of claim 1 wherein the multi-part rod structure is comprised of three separate parts with tubular endmost parts and a centermost part therebetween, the centermost part having reduced opposite ends of reduced cross-sectional configuration for telescoped engagement interiorally of confronting open ends of the said tubular endmost parts whereby the parts can be adjustably positioned relative to at least one of said stands for varying an axial distance between the stands.

5. The archery arrow testing apparatus of claim 2 wherein the longer boss on each of said disks have an axial length exceeding the radial thickness of the disk thus enabling the disks to freely rotate relative to one another when mounted in said cavity.

6. The archery arrow testing apparatus of claim 3 wherein the bosses on each of said disks is mounted in one of said cavities, said bosses having an axial length sufficient to maintaining the disks in the cavity in axially spaced gap, relation for free out-of-contact rotation relative to one another.

7. The archery arrow testing apparatus of claim 2 wherein said mold halves are comprised of synthetic plastic.

8. The archery arrow testing apparatus of claim 1 wherein each of said discs has a central web portion and a radially outer rim, the rim having a greater axial thickness than the central web portion of the disc thus providing a greater arrow engaging surface area on the rim while minimizing the weight and amount of material required to mold the disk.

9. The archery arrow testing apparatus of claim 8 wherein all of said disks are comprised of synthetic plastic, said disks further being of an identical configuration and can be manufactured from a single mold structure.

10. The archery arrow testing apparatus of claim 1 wherein each half has an annular half flange providing a mold half abutment edge for confronting engagement with a corresponding abutment edge on an associated one of said halves in each pair, and means securing said edges in secured confronting abutment together.

11. An archery arrow testing apparatus comprising a pair of upright arrow support stands, the stands being separated and held together by means of a rod structure, means attaching opposite ends of said rod structure to said stands, the stands each being comprised of a pair of stand halves which are of an identical shape and configuration to enable them to be molded in a single mold structure, means securing the mold halves of each stand together, pairs of revolving thin plastic disks, each mold stand having a mold cavity defined by said halves, means mounting each of said pairs of the revolving thin synthetic plastic disks inside an associated one of said cavities in radially overlapped relation so as to define an arrow nip between said disks, with said pairs of disks on each of said stands being rotatable relative to said stands enabling an archery arrow to be spun in circumferential orbit on said pairs of said disks in said nips for human eye scrutiny to ascertain trueness of an orbiting archery arrow.

12. The archery arrow testing apparatus of claim 11 wherein each of said disks have axially centered disk bosses positioned in axially centered relation on opposite sides of the disk associated therewith, the disks being molded in integral assembly with said disk bosses, one of said bosses mounted on each of said disks having a greater axial dimension than another of said bosses thus enabling said radially lapped disks to be positioned in side-by-side lapped axially spaced relation in said cavity to provide said nip.

13. The archery arrow testing apparatus of claim 12 wherein each of said bosses has a pin at an axially outer end, said half each having a pair of apertured bosses disposed on an inner side of the half in confronting relation to the other associated half when the halves are secured together, the pins on the disks being engageable in said apertured bosses so that each disk is secured at opposite sides in a pair of the apertured bosses to provide bearing supports for the disk.

14. The archery arrow testing apparatus of claim 12 wherein the longer boss on each of said disks have an axial length exceeding the radial thickness of the disk thus enabling the disks to freely rotate relative to one another when mounted in said cavity.

15. The archery arrow testing apparatus of claim 13 wherein the bosses on each of said disks is mounted in one of said cavities, said bosses having an axial length sufficient to maintaining the disks in the cavity in axially spaced relation for free out-of-contact rotation relative to one another.

16. The archery arrow testing apparatus of claim 11 wherein said mold halves are comprised of synthetic plastic.

17. The archery arrow testing apparatus of claim 11 wherein each of said stands has a base section and an upper section, said disks being mounted on said upper section and supported by said base section, the base section have a greater transverse cross section than said upper section to increase stability of said arrow support stand.

18. The archery arrow testing apparatus of claim 16 wherein each of said stands has a base section and an upper section, said disks being mounted on said upper section and supported by said base section, the base section have a greater transverse cross section than said upper section to increase stability of said arrow support stand, said stands having indented ends to reduce the amount of material required to manufacture the stand.

19. The archery arrow testing apparatus of claim 11 wherein each of said discs has a central web portion and a radially outer rim, the rim having a greater axial thickness than the central web portion of the disc thus providing a greater arrow engaging surface area on the rim while minimizing the weight and amount of material required to mold the disk.

20. The archery arrow testing apparatus of claim 11 wherein each half has an axially facing edge, a pair of pins mounted on said edge along one side of half, a pair of pin holes provided on said edge along an opposite side of the half such that when said identical halves are positioned in confronting relation, the pin holes and the pins match up and are press fitted together to lock said halves in secured assembly together thus comprising one of said stands.

* * * * *